US005305016A

United States Patent [19]

Quate

[11] Patent Number: 5,305,016

[45] Date of Patent: Apr. 19, 1994

[54] TRAVELING WAVE INK JET PRINTER WITH DROP-ON-DEMAND DROPLETS

[75] Inventor: Calvin F. Quate, Stanford, Calif.

[73] Assignee: Xerox Corporation, Stamford, Conn.

[21] Appl. No.: 801,978

[22] Filed: Dec. 3, 1991

[51] Int. Cl.[5] .............................................. G01D 15/16

[52] U.S. Cl. .............................................. 346/140 R

[58] Field of Search ........................ 346/140 R, 1.1, 75

[56] References Cited

U.S. PATENT DOCUMENTS

| | | | |
|---|---|---|---|
| 4,166,277 | 8/1979 | Cielo et al. | 346/140 R |
| 4,528,571 | 7/1985 | Sweet | 346/75 |
| 4,992,750 | 2/1991 | Stewart | 330/4.3 |
| 5,081,995 | 1/1992 | Lu et al. | 128/662.03 |
| 5,124,716 | 6/1992 | Roy et al. | 346/1.1 |
| 5,138,333 | 8/1992 | Bartky et al. | 346/1.1 |
| 5,179,394 | 1/1993 | Hoshino et al. | 346/140 R |

*Primary Examiner*—A. T. Grimley
*Assistant Examiner*—Sandra L. Brasé
*Attorney, Agent, or Firm*—Rosen, Dainow & Jacobs

[57] ABSTRACT

A traveling wave droplet generator having a drop-on-demand mode of operation. An acoustic mechanism excites a line of peaks of ink just below threshold for ink drop ejection in the orifices of an ink chamber. Electrostatic means raises particular peaks above the threshold using an excitation that is synchronous with the acoustic wave, which gives rise to parametric coupling which enhances the efficiency of the ejection. The electrostatic field can be selectively established at each of the orifices by a conventional addressing mechanism.

8 Claims, 2 Drawing Sheets

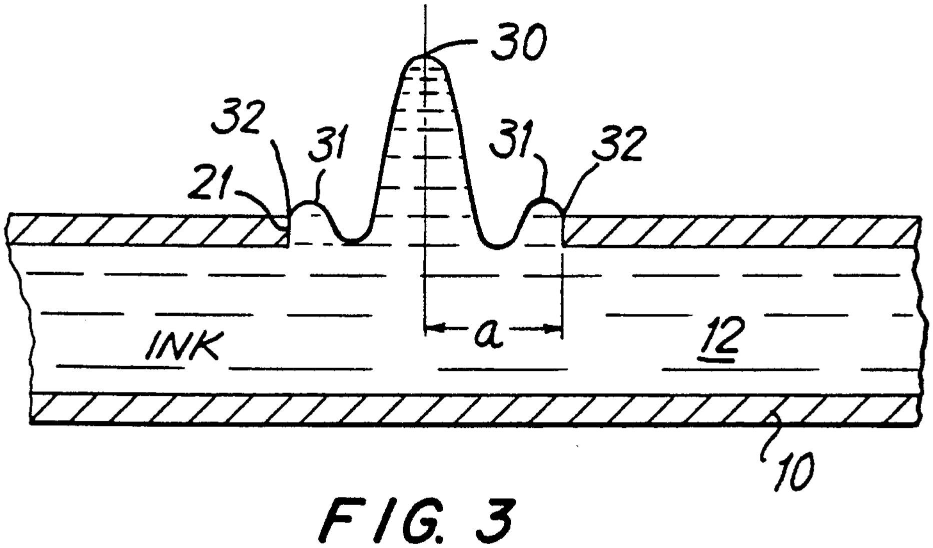
FIG. 3
FIG. 4
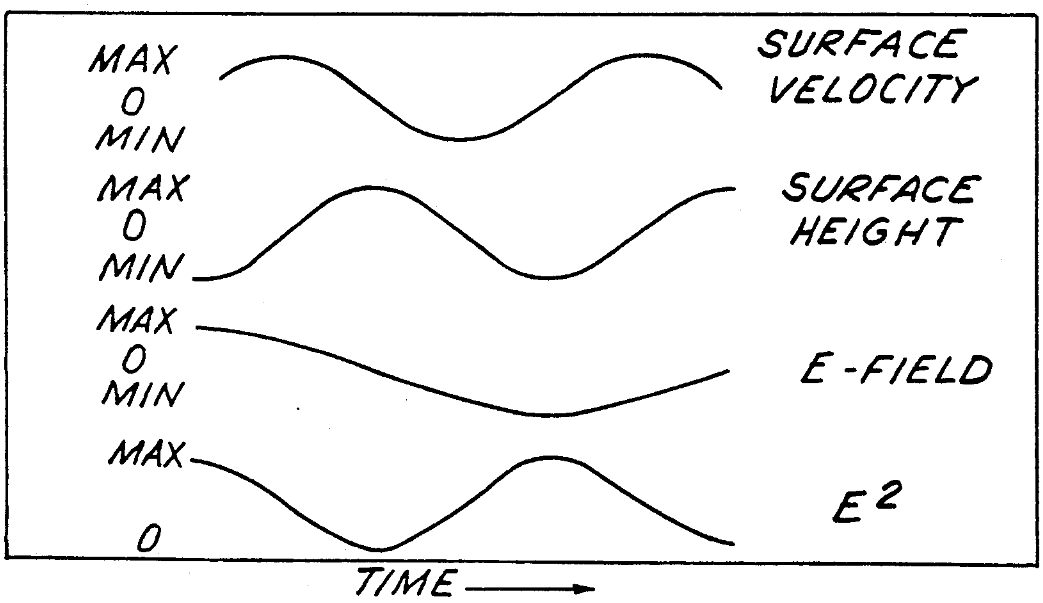

TRAVELING WAVE INK JET PRINTER WITH DROP-ON-DEMAND DROPLETS

This invention relates to ink jet printers, and in particular to ink jet printers of the type using ultrasonic printheads of the traveling wave droplet generator type.

BACKGROUND OF INVENTION

Ink jet printers generally function in one of two modes: continuous stream or drop-on-demand. Ultrasonic printheads have been described in detail in a number of commonly-owned U.S. Pat. No. 4,719,476, whose contents are herein incorporated by reference. This patent in particular describes at length the creation of capillary surface waves which are generated by various means, preferably acoustically, to create standing capillary surface waves in liquid ink filled reservoirs for ejecting droplets from selected crests of the capillary surface waves on command. As one possibility described in this patent, the addressing mechanism, meaning the selection of the sites from which droplets are to be ejected, is accomplished by locally altering the surface properties of selected crests at those sites. For example, the local surface pressure acting on the selected crests or the local surface tension of the liquid within the selected crests may be changed in order to cause droplets to be ejected in a controlled manner from the selected crests.

In another commonly-owned patent, No. 4,746,929, whose contents are also incorporated herein by reference, a so-called traveling wave droplet generator (TWDG) has been described. The TWDG uses a tube that preferably extends the full width of the page on which the printing is to take place. The tube is provided with a series of apertures in a sidewall that are spaced apart from one another, and the core of the tube is filled with the liquid ink. A piezoelectric rod is mounted at on end of the core and excites traveling acoustic waves which traverse the length of the liquid column within the tube and then impinge on an absorbing element mounted at the opposite end which serves as a matching element to eliminate any reflected waves. The acoustic pressure from this traveling wave is sufficient to eject droplets in a continuous stream from each orifice in the sidewall of the tubing. The drops are ejected continuously at the pressure peak of the wave. In order to control which of the ejected drops actually impinge on the paper and leave the desired ink mark, a deflector is arranged above each orifice such that the continuously ejected ink droplets can be deflected on to the paper or into a gutter where it returns to an ink reservoir. Thus, the addressing which corresponds to the places where ink is to be deposited is determined by the electrical signals applied to the deflectors.

SUMMARY OF INVENTION

The present invention is directed to a modified version of the TWDG that is capable of operating in the drop-on-demand mode. This is achieved in accordance with one aspect of the invention by controlling the acoustic mechanism to excite a whole line of peaks of ink at the orifices but just below the threshold of excitation for ink drop ejection. The actual sites at which droplets are ejected is determined by providing means for establishing an excitation field that is substantially synchronous with the acoustic waves, and this additional energy is sufficient to cause selective droplet ejection at the sites at which the excitation is applied.

In accordance with another aspect of the invention, the synchronous excitation is provided by annular or parallel electrodes which are located adjacent to but spaced from each of the orifices in the tube. The addressing signals are applied between the selected electrodes and the tube to establish the desired excitation field at the desired sites. This provides the desired drop-on-demand mode of operation.

In accordance with another feature of the invention, the size of the orifices in the tube is chosen significantly larger than the size of the peak of the ink in the orifice formed by the traveling waves. In particular, the dimensions are chosen and the excitation is such that the peak has the shape of a high order Bessel function which is zero at the orifice edges. This has the advantages that there will be a smaller likelihood of ink clogging at the orifices, and moreover there will be reduced variations in the droplet projection direction as a result of edge effects from the orifices which could significantly affect the projectors of the ejected droplets and thus spoil the resultant print.

These and further objects and advantages of the present invention will be best understood by the description that follows of a preferred embodiment of the invention taken in conjunction with the accompanying drawings.

SUMMARY OF DRAWINGS

In the drawings:

FIG. 3 is a schematic view of an orifice in a TWDG tube showing the liquid ink profile which is characteristic of the invention;

FIG. 4 is a timing diagram showing various waveforms illustrating the parametric coupling which is characteristic of the present invention.

DETAILED DESCRIPTION OF A PREFERRED EMBODIMENT

Figures 1, 2:
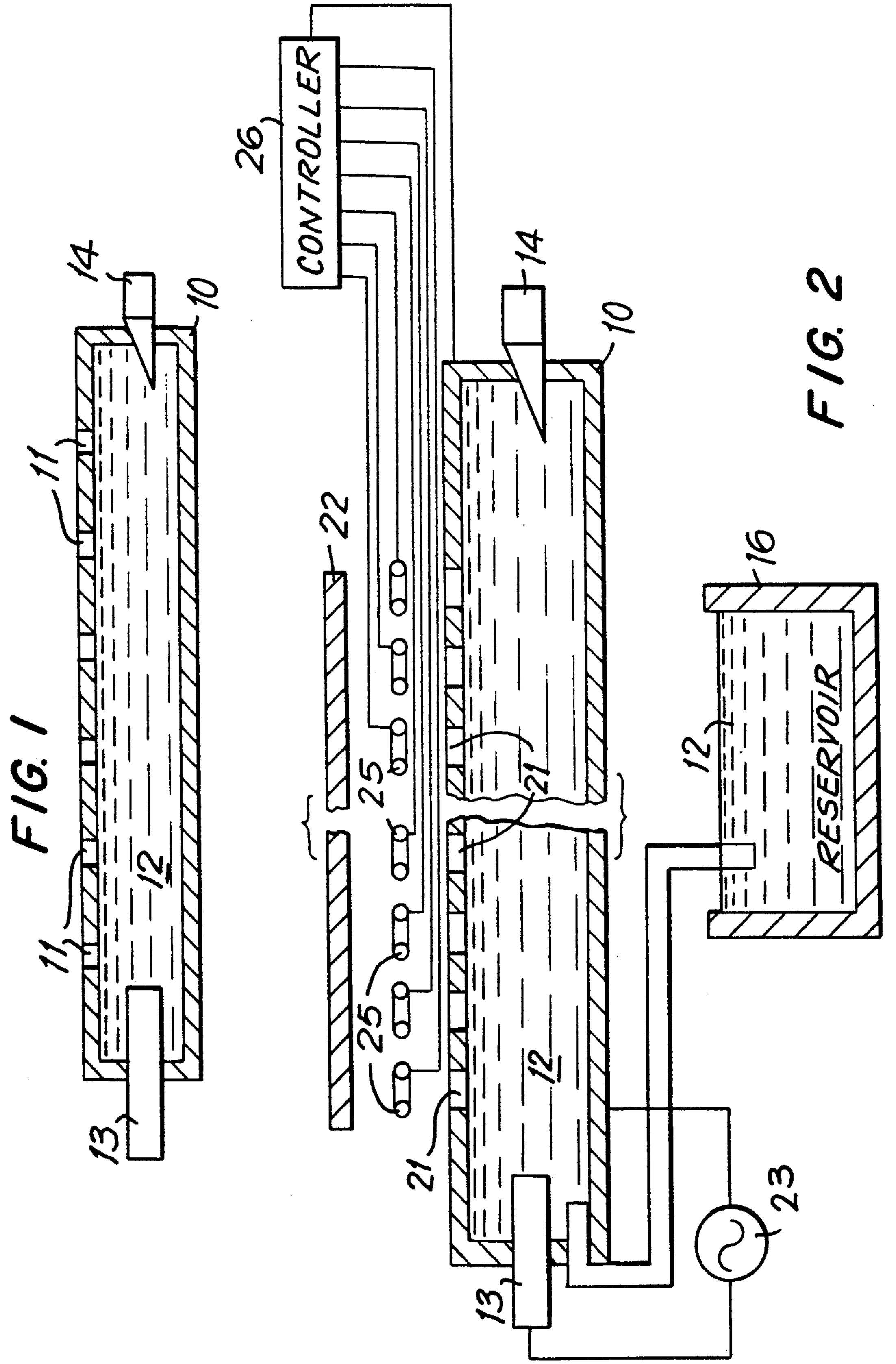
FIG. 1 is a schematic of a typical TWDG.
FIG. 2 is a view of a system in accordance with the invention comprising a drop-on-demand TWDG together with a schematic view of the activating electronics.

FIG. 1 shows a schematic view of a typical TWDG for the purpose of illustrating the background of the invention. It comprises a tube 10 which preferably extends the full width of the page on which the printing is to take place. The tube can contain a series of orifices 11 in the sidewall which are spaced apart from one another, and the core of the tube is filled with liquid ink 12. Means not shown would be present to maintain the column of ink within the tube so that it completely fills the tube.

At the left end of the tube there is mounted a conventional piezoelectric rod 13 which, as has been described in the referenced patents, excites traveling waves of sound which traverse the length of the liquid column 12. These traveling waves impinge on an absorbing element 14 located at the opposite or right hand end of the tube and which functions as a matching element to eliminate any reflected waves. Thus, a sound wave is generated at the left end of the ink column or input and travels through the column to the output at the right end. In the system described in the prior art, the pressure from this acoustic wave is sufficient to cause a continuous ejection of droplets, one per cycle of the acoustic wave, from each orifice 11 in the sidewall of the tube 10. The present invention significantly differs from what has been so far described in connection with this type of ink jet printer to provide the more desirable drop-on-demand mode of operation. This is illustrated in the system diagram of FIG. 2.

The invention illustrated in FIG. 2 uses a chamber in the form of a tube 10 as in the prior art TWDG whose core is filled with the liquid ink 12 supplied from a suitable reservoir 16. As before, the acoustic wave generator 13 is situated at the left end and can be, for example, a piezoelectric rod or any of the other sonic wave generators described in the early referenced patents. Similarly, the absorbing element 14 is mounted at the right hand end and again serves to eliminate any reflected waves. As before, there is a row of orifices, in the form of apertures which are preferably round o cylindrical in the sidewall of the tube, which are referenced 21, and these orifices 21 are differently dimensioned than those employed in the prior art TWDG as will be further explained below. The paper on which the printing is to take place is represented by the rectangle 22 and in the usual way is caused to pass over the printhead illustrated by the conventional driving mechanisms. Preferably, the series of apertures or orifices 21 in the sidewall of the tube cover a length substantially equal to the width of the page, so, in effect, a line printer results.

A traveling wave of sound is created within the column of ink 12 within the tube 10 by means of conventional alternating generator 23. Located above each of the orifices 21 in the sidewall of the tube is an electrode 25, preferably in the form of a small ring or as two parallel connected conductors symmetrically arrayed on each side of the orifice. Each of those electrodes 25 is connected to a conventional controller 26 which generates the appropriate excitation pulses to the electrodes to selectively eject droplets of ink as will be described below.

In the invention, the spacing of the orifices 21 is preferably chosen to correspond to the pixel spacing desired on the printed page 22. For example, 300 per inch for a 300 dot per inch printer. The diameter of each orifice is chosen to correspond to the resonant diameter for the wavelength of the capillary wave that is excited by the periodic pressure exerted on the surface of the liquid filling each orifice 21 by the sonic wave generator 13. The resultant capillary wave will form a standing wave in the preferably circular aperture of each of the orifices 21. The orifice dimension is such that the amplitude of the standing wave will be maximum at the center of the orifice and a minimum at the edge of the orifice which can act as a reflector of the traveling sonic wave. The profile of the capillary wave surface will be similar to that of an excited drumhead and preferably has the shape of a high order Bessel function. The has a zero value at the orifice edges.

A typical profile is shown in FIG. 3 for the case where the orifice is a non-wetting surface. As shown, the standinq wave will have a peak 30 located approximately within the central region of the orifice, and a secondary peak 31 located near the edge but no significant liquid height at the orifice edges 32. The liquid profile will be of the form $J_0(\pi a/\lambda)$, where a is the spacing between the peak center and the orifice edge as indicated in FIG. 3, and $\lambda$ is the wavelength of the capillary wave. In general, the capillary wave will be resonant in the orifice if $J_0(\pi\alpha/\lambda)=0$, which is the condition for having a node, or a "Bessel zero", at the orifice rim. The $J_0(\pi\alpha/\lambda)=0$ when $\pi\alpha/\lambda$ is approximately equal to 2.4 (the "first zero" case), or 5.5 (the "second zero" case or 8.6 (the "third zero" case illustrated in FIG. 3) etc. This profile which be characterized by this Bessel function has the advantage that the peak is contained within the central region spaced from the orifice rim. Thus, the diameter of the ejected ink droplet will be determined by the spatial extent of this central peak 30 and not by the full diameter of the orifice 21. This will reduce the effect of small perturbations in the edge conditions of the orifice, for example from dried ink residue, that can produce changes in the trajectory of the droplet when it is ejected from the orifice.

As previously mentioned, the acoustic mechanism excites a whole line of ink peaks as illustrated as in FIG. 3 for the third zero case in each orifice 21, but just below the threshold of energy required for ink drop ejection. This is where the electrodes 25 come into play. The electrodes 25 as mentioned are preferably in the form of an annular electrode or parallel electrodes or other shape with an aperture or passageway through which the ejected droplet can pass. The controller 26 provides signal pulses between each of the selected electrodes 25 and the chamber 10 containing the ink column 12. The signal voltage applied to the selected electrode 25 will establish an electric field on the liquid surface in the orifice of such a magnitude as to eject a droplet of ink. Preferably, the signal voltage alternates at a frequency that gives a synchronous pull to the surface of the liquid when the resonant capillary motion in the orifice pushes the surface of the ink to its maximum height. In this way the effective pull of the electrostatic field will be amplified by the parametric time varying force on the surface.

This is illustrated in the waveforms of FIG. 4 which shows at the top as a function of time the waveform representing the surface velocity of the ink within each of the orifices, and in the second waveform from the top the variation in height of the ink surface during that same period of time. The third waveform below represents the electrostatic or E field at the surface as a result of the signal applied by the controller 26 to the electrode 25. The bottommost curve in FIG. 4 is a waveform representing the squared electrostatic field, $E^2$, at the surface, which is representative of the surface force generated by the electrostatic field at the ink surface. As will be observed, the timing is such that the surface force represented by $E^2$ reaches a maximum as the surface velocity of the liquid in the orifice is increasing so as to reinforce and amplify the capillary wave forces, which jointly will result in ejection of the droplet.

Summarizing, the present invention is based on the concept of a TWDG employing a synchronous electrostatic addressing mechanism for selectively attracting individual droplets of ink from the capillary waves that are acoustically generated by the TWDG. This produces the desired drop-on-demand mode of operation. The signal voltage used to establish the electrostatic field alternates in time so as to be substantially synchronous with the pulsating crest of the capillary wave that is excited in each orifice by the sound wave in the main channel. In addition, appropriate sizing of the orifices in the sidewalls of the ink chamber and appropriate choice of the excitation frequencies are such that the orifice size corresponds to the resonant diameter for the wavelength of the capillary wave that is excited by the periodic pressure. This spatial resonance causes the capillary wave to form a standing wave in each orifice which has a Bessel function-like profile, with the zero in the Bessel function occurring at the orifice edges. This offers the advantages that the ejected droplet diameter is determined by the spatial extent of the Bessel function peak within the central region of the orifice, rather than the orifice diameter. This will prevent variations in the edge effects of the orifice from significantly affecting the trajectories of the ejected droplets. In addition, there should be less clogging of the ink in the orifices.

Still further advantages include: the resonance between the oscillating crest and the ejection signal voltage will enhance the ejection process and allow the use of lower signal voltages on the electrodes; the new form of the ejectors will allow closer spacing of the orifices, for example, the pixel spacing on the printed page, thereby reducing or eliminating the stitching encounted with other printheads. It is therefore evident from the foregoing description that a significant advance in the art of ink jet printers has been achieved by the invention.

For further details on the various components employed in the system of the invention, reference is made to the earlier identified patents which provide more details on, for example, the piezoelectric driver and absorber, the addressing circuitry, and the construction of the traveling wave tube 10. As an example, which is not intended to be limiting, of parameters that are suitable for producing the parametric coupling desired, the alternating frequency 23 supplied to the sonic driver 13 can range from about 10 to 100 kHz; the wavelength, λ, of the resultant capillary waves will thus range from about 20 to 200 microns; the orifice 21 diameters can range from about 30 to 300 microns.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. An ink jet printer of the traveling wave droplet generator type, comprising an ink channel formed by an elongated tube having orifices and having at one tube end an acoustic wave generator and having at the opposite tube end an acoustic wave absorber, means for establishing adjacent each orifice an electric field exerting a pulling force on ink in the orifice, and means for applying a parametric time varying force to the ink surface synchronized so as to reinforce and amplify the pulling force of the electric field so as to selectively eject ink droplets from one or more of the orifices.

2. An ink jet printer comprising:

an elongated chamber having walls confining ink and having a plurality of apertures arranged substantially in a row along one wall of said chamber, means for establishing in the ink in the chamber at one end of the row a traveling acoustic wave that travels along the length of the chamber parallel to the row of chambers, said apertures being sized in relation to the period of the traveling wave so as to correspond to the resonant size for the wavelength of a standing capillary wave forming in each aperture and having a profile that is a maximum at the aperture center and a minimum at the aperture edge, electrode means adjacent each aperture for forming when energized at the ink liquid surface in each aperture an electric field of such magnitude as to eject a droplet of ink from an aperture.

3. The ink jet printer of claim 2, wherein the profile corresponds to a Bessel function having a zero at the apertures edges.

4. The ink jet printer of claim 3, wherein the electrode means comprises annular electrodes external to the chamber and adjacent each aperture.

5. The ink jet printer of claim 3, wherein the electrode means comprises parallel electrodes external to the chamber and adjacent each aperture.

6. The ink jet printer of claim 2, wherein the function is of the form $J_O(\pi a/\lambda)$, where a is the spacing of the profile maximum to the aperture edge, and λ is the wavelength of the capillary wave.

7. The ink jet printer of claim 6, wherein the value of $\pi\alpha/\lambda$ is substantially equal to 2.4, 5.5 or 8.6.

8. The ink jet printer of claim 2, wherein an acoustic absorber is located in the chamber at the opposite end of the row of apertures.

* * * * *